(No Model.)
W. H. KNAP.
VAGINAL SYRINGE.
No. 468,151. Patented Feb. 2, 1892.
Fig. 2. 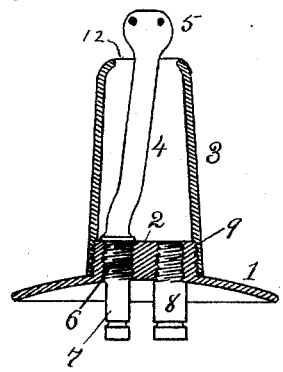 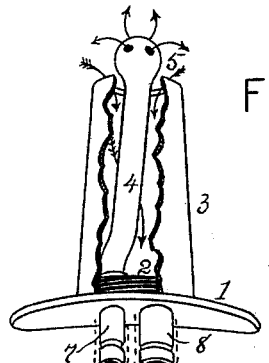 Fig. 1.
ATTEST
Helen Graham
W. W. Graham
INVENTOR
W. H. KNAP.
By L. P. Graham
his attorney

UNITED STATES PATENT OFFICE.

WILLIAM H. KNAP, OF INDIANAPOLIS, INDIANA.

VAGINAL SYRINGE.

SPECIFICATION forming part of Letters Patent No. 468,151, dated February 2, 1892.

Application filed April 2, 1890. Serial No. 346,346. (No model.)

*To all whom it may concern:*

Be it known that I, WILLIAM H. KNAP, of Indianapolis, in the county of Marion and State of Indiana, have invented certain new and useful Improvements in Vaginal Syringes, of which the following is a specification.

It is the object of this invention to enable the syringe to be used in any position without leakage, to carry away the fluid used, and so render a bed-pan unnecessary, to make any desired distension of the vagina, to allow the fluid to come in contact with the entire vaginal surface, and to so arrange and connect the different parts as to permit the device to be easily and effectively cleaned.

I attain my object by means of the details of construction and combinations of parts hereinafter set forth and claimed, reference being had to the drawings accompanying and forming a part of this specification, and in which—

Figure 1 is a representation of my device with a portion of the outer duct broken away, and Fig. 2 is a central longitudinal section of the syringe.

The guard 1 is a concavo-convex disk, preferably of elliptical form, and it has the threaded boss 2, on which the outlet-duct 3 is screwed and through which pipes 7 and 8 extend. Pipe 7 has the threaded portion 6, which is adapted to a threaded hole in the boss. It extends upward through the outlet-duct as deflected pipe 4, and it terminates in bulb 5, having a set of lateral perforations. The pipe 8 has the threaded portion 9, which screws into a hole in the boss and connects with the interior of duct 3. Pipe 7 has a flexible tube 10, (indicated by dotted lines in Fig. 1,) which tube has the customary compression-bulb and valve, and which connects with the fluid to be used. Pipe 8 has a flexible tube 11, which connects with a vessel designed to receive the discharged fluid.

The device is inserted into the vagina until the annular rim of the guard bears firmly against the sides of the orifice, and water or other fluid is supplied by operating the compression-bulb in the customary manner. The guard prevents leakage, and the fluid is forced to pass through the duct 3, the pipe 8, and the tube 11 to a suitable receptacle. The vagina may be distended to any desired degree and the entire vaginal membrane be subjected to the effect of the fluid by occluding the outlet and continuing the supply of fluid. As the fluid used passes from one vessel to another, acting on the vagina in transit, it is evident that the position of the user cannot affect the efficiency of the operation and that wetting or soiling of garments or bedding need not occur.

The parts are all detachable one from another, and consequently it is an easy matter to keep the device thoroughly cleaned.

It will be seen that the perforated bulb 5 serves to protect and keep open the passage at 12 in the front end of the duct 3, so that it will permit the free exit of liquid forced in through the bulb.

The detachable tubes 10 and 11 being of the usual kind of course form no part of the novelty of my invention; but the organization together of four detachable parts described, when constructed and arranged as set forth, constitute an improved device which is very efficient in operation and which is easily taken to pieces and kept clean and in order.

What I claim is—

The combination of the guard 1, provided with the threaded boss 2, the threaded duct 3, open at its front end, the threaded pipe 7, extending up into the boss and continuing through the duct 3 as deflected pipe 4, having perforated bulb 5, and threaded pipe 8, all these parts being detachable and arranged and operating substantially as set forth.

In testimony whereof I sign my name in the presence of two subscribing witnesses.

WILLIAM H. KNAP.

Attest:
SAMUEL SAWYER,
WILLIAM A. DYE.